United States Patent [19]
Perisho, Jr. et al.

[11] Patent Number: 6,098,296
[45] Date of Patent: Aug. 8, 2000

[54] WHEEL ALIGNMENT SYSTEM AND METHOD FOR VEHICLES HAVING STEER-BY-WIRE STEERING SYSTEM

[75] Inventors: Robert Allan Perisho, Jr., Russiaville; Kevin Michael Deasy, Noblesville, both of Ind.

[73] Assignee: Delco Electronics Corp., Kokomo, Ind.

[21] Appl. No.: 09/204,486

[22] Filed: Dec. 3, 1998

[51] Int. Cl.$^7$ .............................. G01B 5/20; G01B 5/24
[52] U.S. Cl. ................... 33/203; 33/203.18; 73/1.75; 701/29; 701/34; 701/33; 702/94; 702/150
[58] Field of Search ................... 7023/94, 150, 7023/151; 701/33, 34, 29; 73/1.75; 33/203, 203.18, 288

[56] References Cited

U.S. PATENT DOCUMENTS

| | | | |
|---|---|---|---|
| 4,394,798 | 7/1983 | Beissbarth | 33/203.18 |
| 5,335,420 | 8/1994 | Kling, III et al. | 33/288 |
| 5,519,488 | 5/1996 | Dale, Jr. et al. | 33/203.18 |
| 5,531,030 | 7/1996 | Dale, Jr. | 33/203 |
| 5,600,435 | 2/1997 | Bartko et al. | 33/203.16 |
| 5,948,024 | 9/1999 | O'Mahony et al. | 701/29 |

*Primary Examiner*—Randy W. Gibson
*Attorney, Agent, or Firm*—Jimmy L. Funke

[57] ABSTRACT

The present invention provides for a wheel alignment procedure for a vehicle having a steer-by-wire steering system. The wheel alignment procedure includes determining an offset alignment value for a road wheel of a vehicle. The offset alignment value may be determined as the difference between the sensed wheel angle and a measured true angular position of the road wheel. The method further includes the step of adjusting the road wheel position as a function of the offset alignment value. Accordingly, the vehicle road wheel can be aligned by adjusting a calibration value in a controller without requiring physical adjustment of a mechanical linkage.

13 Claims, 3 Drawing Sheets

WHEEL ALIGNMENT SYSTEM AND METHOD FOR VEHICLES HAVING STEER-BY-WIRE STEERING SYSTEM

BACKGROUND OF THE INVENTION

The present invention generally relates to vehicle wheel alignment techniques and, more particularly, to a wheel alignment system and method for aligning one or more wheels on a vehicle equipped with a steer-by-wire steering system.

Land vehicles are commonly equipped with a set of road wheels that rotate to allow easy movement of the vehicle. Automotive vehicles are conventionally equipped with a pair of front wheels that are controllably steerable to allow the vehicle to turn left and right as it maneuvers on land. Recently, four wheel steering has also become commercially available for use in vehicles. It is important to provide for proper alignment of the wheels such that the wheels roll straight without scuffing, dragging, or slipping under different road conditions. Proper wheel alignment affords sure steering, long tire wear, and places less stress on many vehicle parts. With modern day vehicles, it is common for the front wheels in particular to get out of alignment gradually through normal wear and tear. Accordingly, normal vehicle maintenance may require routine wheel alignments to bring the wheels back into proper alignment.

The conventional wheel alignment technique typically involves a mechanical alignment procedure which requires that the manually operated hand steering wheel be held in a centered position while the vehicle's tie-rods are mechanically loosened and the wheels are individually set to zero degrees. Once the wheels are individually set to zero degrees, such that they are aligned with the body of the vehicle as measured by an alignment fixture, the individual tie-rods are then retightened. The vehicle tie-rods may have to be loosened and retightened repeatedly, depending on the amount of mechanical movement that occurred during the previous tightening processes. The conventional mechanical alignment procedure may require repeated mechanical operations that can result in a time-consuming alignment procedure. The mechanical wheel alignment procedures are further complicated for a four wheel alignment which requires further measurements and adjustments.

Recently, steer-by-wire steering systems have been introduced into automotive vehicles to provide easy to steer wheel control. Included in a typical steer-by-wire steering system is a steering wheel subsystem for monitoring the position of the steering wheel, wheel actuation controllers, and corresponding electric motor actuators for controlling actuation of the individual wheels. The steer-by-wire steering system turns the road wheels left and right with the motor actuators which are controlled by controllers in response to tracking the sensed steering wheel position. In contrast to the presence of a mechanical linkage in prior steering systems, the steer-by-wire steering system does not employ a mechanical linkage between the steering wheel and the individual wheels. For safety and reliability, the steer-by-wire steering system generally employs redundant steering wheel sensors, redundant controllers, and redundant actuators. Similar to other conventional steering systems, the road wheels for a vehicle equipped with the steer-by-wire steering system generally have been aligned according to the time-consuming standard mechanical wheel alignment procedure.

It is therefore one object of the present invention to provide for a quick wheel alignment procedure to align one or more wheels of a vehicle. It is a further object of the present invention to provide for a wheel alignment procedure for quickly and easily aligning one or more wheels of a vehicle equipped with a steer-by-wire steering system. It is yet another object of the present invention to provide for a wheel alignment procedure that efficiently aligns vehicle wheels without requiring readjustment of a mechanical linkage. Yet, it is a further object of the present invention to provide for a vehicle wheel alignment procedure which does not require the vehicle wheels to be initially set to a predetermined direction.

SUMMARY OF THE INVENTION

The present invention provides for a wheel alignment system and method for a vehicle having a steer-by-wire steering system. The wheel alignment procedure includes the step of measuring an offset alignment value for a wheel on a vehicle. The offset alignment value is preferably determined by sensing a wheel angle and measuring a true wheel angle, and computing the offset alignment value as the difference between the sensed wheel angle and the measured true wheel angle. The wheel alignment procedure further includes the step of adjusting the wheel position as a function of the offset alignment value. Accordingly, the vehicle wheel can be realigned by adjusting the offset angle calibration point in a wheel actuation controller without requiring physical adjustments to a mechanical linkage.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
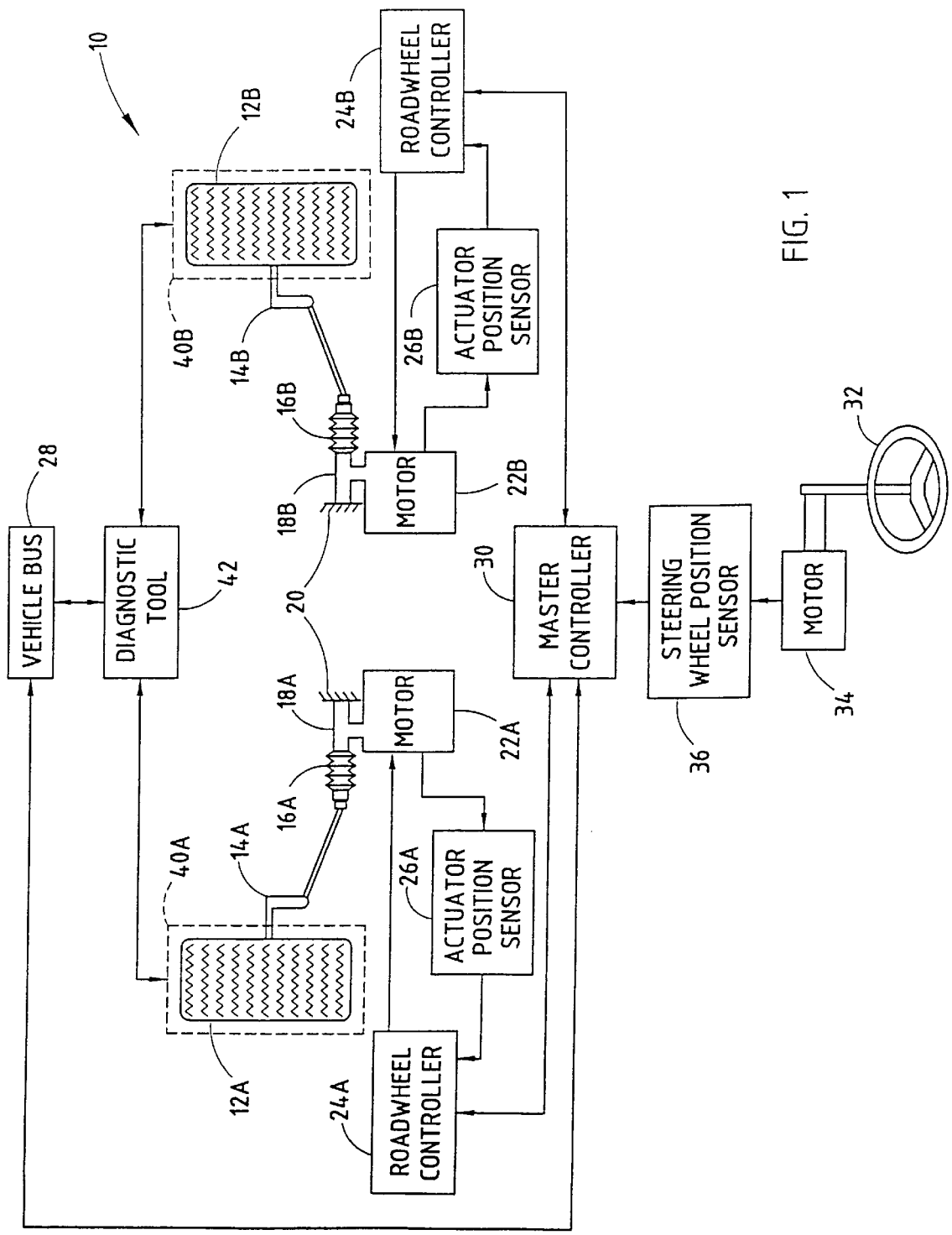
FIG. 1 a block diagram illustrating a vehicle steer-by-wire steering system equipped to perform a wheel alignment procedure according to the present invention.

Referring to FIG. 1, a steer-by-wire steering system 10 for an automotive vehicle is shown equipped to perform a wheel alignment procedure according to the present invention. The vehicle steer-by-wire steering system 10 as shown includes a pair of road wheels 12A and 12B, such as the front wheels on a front wheel steered vehicle. Wheel 12A, also referred to as the left wheel, is connected to a drive linkage 14A, which in turn is connected to bellows 16A mounted on an axle 18A of the vehicle. The axle 18A in turn is mounted to the vehicle frame 20. Wheel 12B, also referred to as the right wheel, is connected to a drive linkage 14B which in turn is connected to bellows 16B. Bellow 16B is connected to axle 18B which is in turn connected to the vehicle frame 20.

According to the vehicle steer-by-wire steering system 10, each steerable road wheel of vehicle 10 is movably actuated with an actuator motor and a road wheel controller. In particular, an actuator motor 22A is connected to bellows 16A for actuating the left wheel 12A so that wheel 12A turns left or right. A road wheel controller 24A is associated with motor 22A to control the actuator motor 22A. In addition, an actuator position sensor 26A is provided to monitor the position of the actuator motor 22A which serves as a measurement of the angle of wheel 12A. The monitored position of actuator motor 22A is input to road wheel controller 24A.

The right wheel 12B of the vehicle's steer-by-wire steering system 10 likewise includes an actuator motor 22B for actuating the right wheel 12B to turn left or right. Actuator motor 22B is controlled by an associated road wheel controller 24B. In addition, an actuator position sensor 22B monitors the position of the actuator motor 22B which serves as a measurement of the angle of wheel 12B. The monitored position of actuator motor 22B is input to road wheel controller 24B. Accordingly, the left and right wheels 12A and 12B, respectively, are each independently steered by independently controlled motor actuators.

The vehicle steer-by-wire steering system 10 also includes a hand-operated steering wheel 32 which is intended to be manually rotated by the driver of the vehicle 10 to steer the vehicle. Steering wheel 32 may be equipped with a motor 34 that may serve to provide power steering assistance and an adequate amount of rotational resistance to realize easy and controlled steering. A steering wheel position sensor 36 monitors the rotational position of the steering wheel 32, either directly from the steering wheel shaft or from the motor 34, and produces a steering wheel position signal.

The vehicle steer-by-wire steering system 10 further includes a master controller 30 for controlling the vehicle's overall steering operation and wheel alignment procedure. Master controller 30 may include a general purpose microprocessor-based controller, and may include a commercially available off-the-shelf controller. Master controller 30 preferably includes a processor and memory for storing and processing software algorithms which process sensed vehicle information and provide output control signals to the road wheel controllers 24A and 24B to control actuation of the corresponding road wheels 12A and 12B. In addition, master controller 30 is programmed with software to perform the wheel alignment procedure according to the present invention as is explained herein.

To perform a vehicle wheel alignment on wheels 12A and 12B, alignment racks 40A and 40B and an interfaceable diagnostic tool 42 are used. The vehicle to be aligned is located such that the wheels 12A and 12B to be aligned are individually positioned on alignment racks 40A and 40B, respectively. Alignment racks 40A and 40B may include a conventional wheel alignment fixture of the type known in the vehicle wheel alignment art for measuring the angular position of a wheel. Each of alignment racks 40A and 40B is clamped to the corresponding wheel to be aligned and provides a true angular measurement of the orientation of the wheel.

The diagnostic tool 42 may include a hand-held diagnostic tool, or other interfaceable tool, coupled to the alignment racks 40A and 40B to receive the measured true angular position signals for each of wheels 12A and 12B. The diagnostic tool 42 is further coupled to the master controller 30 through the vehicle bus 28, and serves to download the measured true angular position signals from the alignment racks 40A and 40B to the master controller 30. More particularly, the diagnostic tool 42 is connected to the vehicle's data bus 28, such as a SAE J1850 bus, by way of a bus interface connector, as is understood in the art.

During a wheel alignment procedure, the master controller 30 receives the true angular position signals for each of wheels 12A and 12B as generated by respective alignment racks 40A and 40B and downloaded via diagnostic tool 42. The signal downloading preferably occurs during a selected wheel alignment check mode that can be made available with diagnostic tool 42. In addition, master controller 30 receives the measured wheel angle signals from actuator position sensors 26A and 26B. Master controller 30 compares the sensed wheel angle generated by the actuator position sensor with the true wheel angle measured by the alignment rack and determines an offset alignment value for each wheel by computing the differences between the two signals. The computed offset alignment value is stored in the master controller 30 and is used as the new offset alignment value to establish a realigned wheel position. All future steering commands to the road wheel use the offset to send corrected steering commands. Therefore, the steer-by-wire steering system 10 is recalibrated with new offset alignment values, without requiring adjustment of a mechanical linkage. The master controller 30 also receives the sensed steering wheel position signal from steering wheel position sensor 36.

Figure 2:
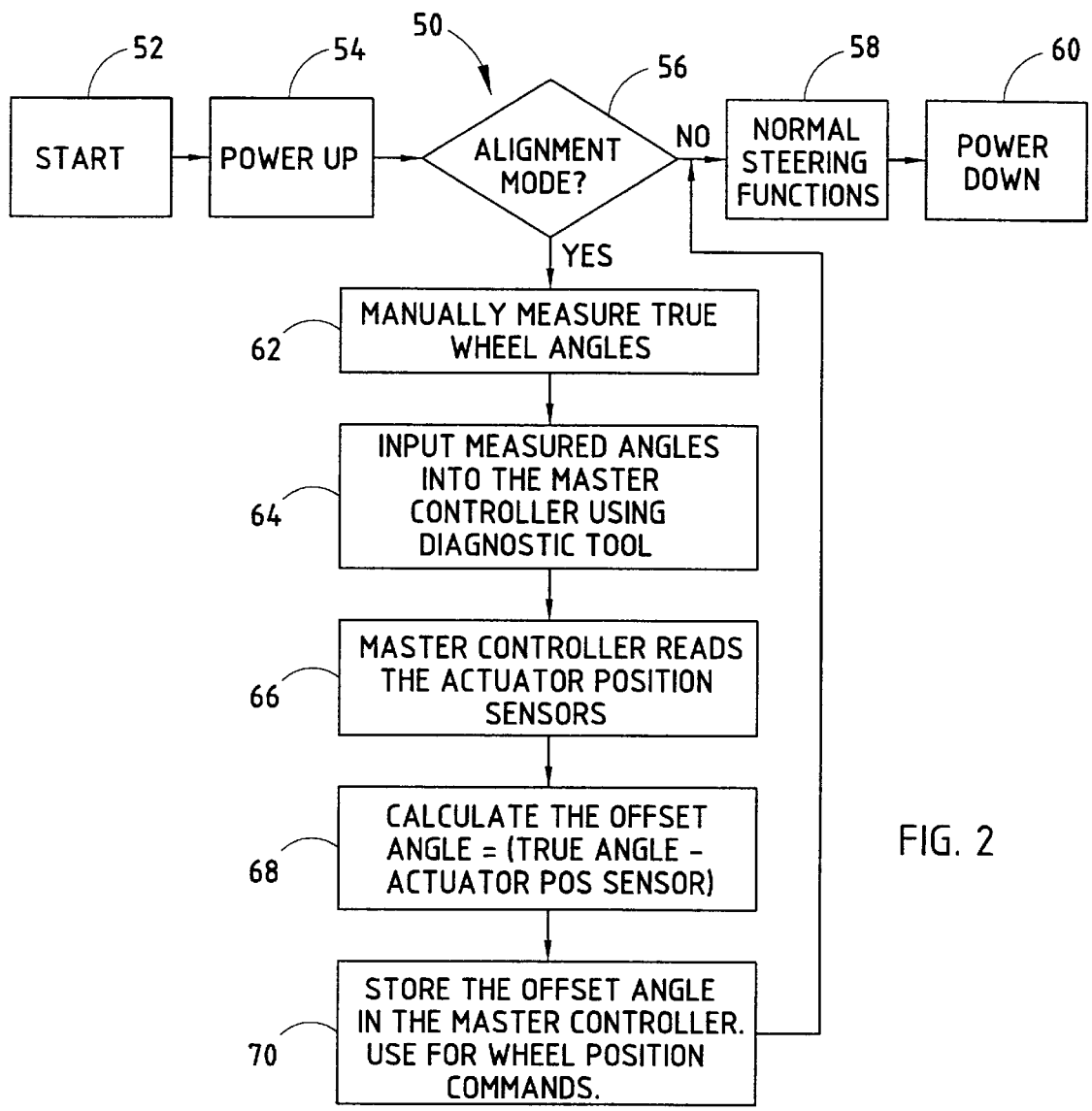
FIG. 2 is a flow diagram illustrating a methodology for aligning the wheels of the vehicle according to the present invention.

Referring to FIG. 2, a vehicle wheel alignment methodology 50 is shown for performing the wheel alignment procedure on a vehicle according to the present invention. Beginning at step 52 of wheel alignment methodology 50 the vehicle is started, and proceeds to step 54 to power-up the vehicle. Proceeding to step 56, methodology 50 checks for the presence of a wheel alignment mode and, if recognized, initiates those steps for performing the wheel alignment procedure. Provided the road wheels 12A and 12B are individually positioned on the alignment racks 40A and 40B and the diagnostic tool 42 is in communication with the vehicle's master controller 30, methodology 50 proceeds to step 62 to measure the true wheel angle with the alignment rack for each wheel to be aligned. It should be appreciated that the true wheel angle measurement can be made at any steering wheel position, without requiring alignment of the steering wheel with the vehicle body. Since the wheel angle does not have to be set equal to zero degrees, a steering wheel alignment step is eliminated. In step 64, the measured true wheel angle is downloaded to the master controller 30 via the diagnostic tool 42. In step 66, the master controller 30 reads the wheel angles sensed by the actuator position sensors 26A and 26B. Next, in step 68, master controller 30 compares the sensed wheel angle with the measured true wheel angle and computes an offset alignment angle for each wheel. The offset alignment angle is computed as the difference between the sensed wheel angle and the measured true wheel angle. The computed offset alignment angle is then stored in the master controller 30 as the new offset alignment value in step 70. The new offset alignment value is used to compensate for any previous misalignment and is used to control the wheel position.

Once the offset alignment value is computed for each wheel to be aligned, methodology 50 proceeds to step 58 to resume normal vehicle steering functions in step 58, until a vehicle power-down 60 occurs as indicated in step 60. The offset alignment value is advantageously used by the master controller 30 to correct for all future wheel position commands, and therefore all subsequent wheel actuation movement is automatically compensated for by the amount of the computed offset alignment value. It should be understood that the wheel alignment process set forth in steps 62–70 are repeated for each of the vehicle wheels to be aligned. It should be appreciated that the wheel alignment procedure 50 is implemented without requiring any mechanical adjustment of any mechanical linkage on the vehicle. It should also be appreciated that the wheel alignment procedure 50 provides for easy and quick alignment of the wheels of the vehicle equipped with a steer-by-wire steering system using software and a standard alignment fixture, without requiring the mechanically labor intensive methods of the prior known techniques. Further, it should be appreciated that the alignment procedure does not need to be repeated for the same wheel to realize an acceptable wheel alignment position.

Figure 3:
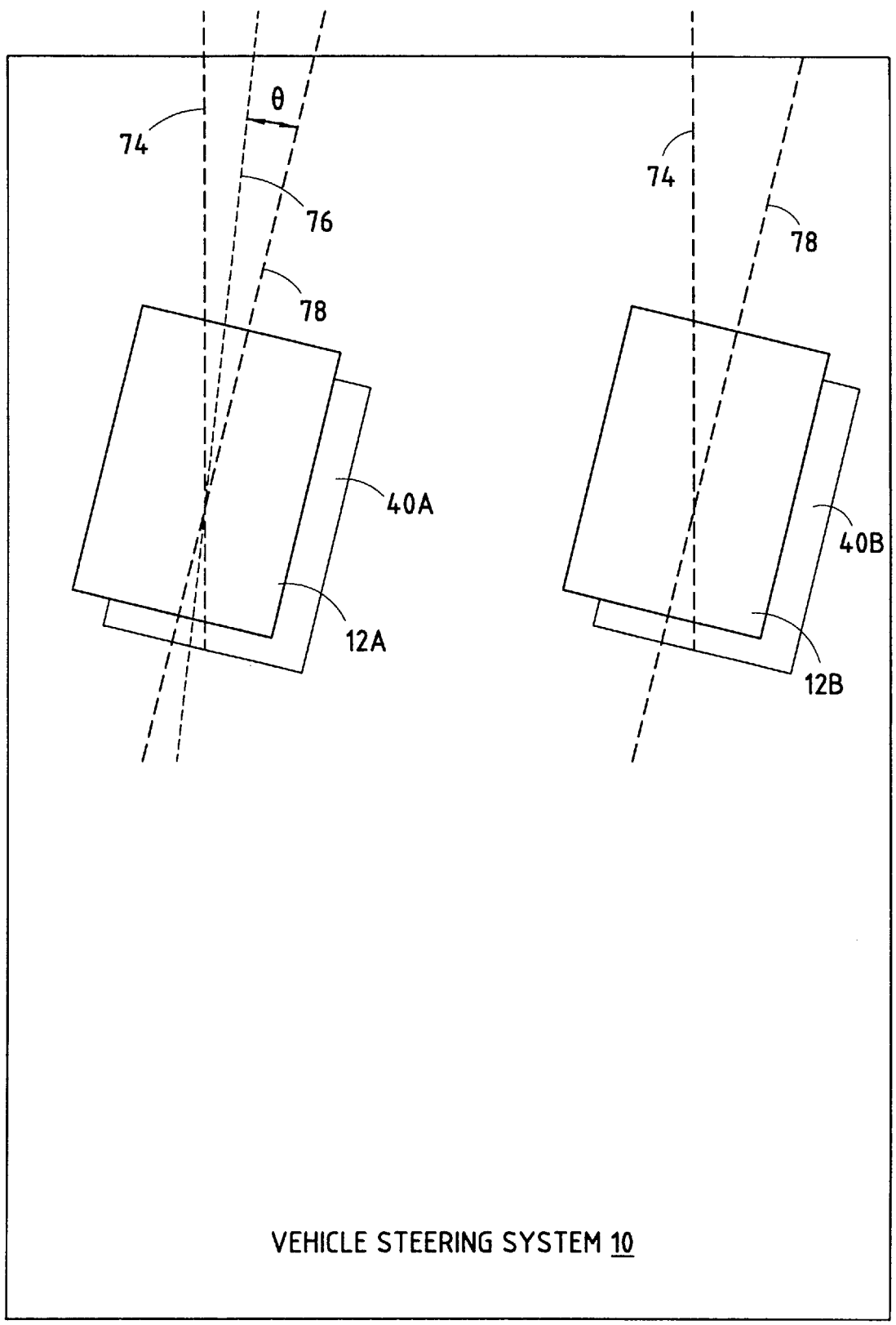
FIG. 3 illustrates a wheel alignment measurement according to the wheel alignment methodology of FIG. 2.

With particular reference to FIG. 3, the wheel angle measurements taken during the wheel alignment procedure are shown therein. Wheels 12A and 12B may be positioned on respective alignment racks 40A and 40B at any angle relative to the axis 74 of the vehicle body. For example, the true wheel axis 76 does not have to be aligned with vehicle body axis 74 as shown, and therefore is not set to a value of zero degrees relative to the vehicle body axis 74. However, the sensed wheel angle position signals show a misaligned wheel axis 78. The wheel alignment procedure computes the offset alignment angle θ to correct for the misalignment to automatically realign the corresponding vehicle wheel. Despite being set to a non-zero degree value, the wheels of the vehicle are independently aligned by measuring the offset alignment angle θ as the difference between the wheel angle position sensed by sensor 26A or 26B and the true angle as measured by the alignment rack 40A or 40B. The offset alignment angle θ is stored in the master controller 30 to recalibrate the wheel alignment offset value in the road wheel controller corresponding to the wheel It will be understood by those who practice the invention and those skilled in the art, that various modifications and improvements may be made to the invention without departing from the spirit of the disclosed concept. For example, terms such as "program" and "controller" may mean a microprocessor or microcontroller as particularly disclosed in accordance with the preferred embodiment or any other essentially normal analogous device, including hard wired, fixed-program controllers or circuitry, etc. The scope of protection afforded is to be determined by the claims and by the breadth of interpretation allowed by law.

The invention claimed is:

1. A wheel alignment method for aligning one or more road wheels of the vehicle, said method comprising the steps of:
   measuring a true angular position of a road wheel of a vehicle;
   sensing a wheel angle position of the road wheel;
   determining an offset alignment value as a function of said measured true angular position and said sensed wheel angle position; and
   adjusting angular position of the road wheel as a function of said offset alignment value.

2. The method as defined in claim 1, wherein said step of determining an offset alignment value comprises computing the difference between said sensed wheel angle position and said measured true angular position.

3. The method as defined in claim 1 further comprising the steps of:
   sensing the position of a steering wheel of the vehicle; and
   commanding the road wheel of the vehicle to a position as the function of the sensed steering wheel position and said offset alignment value.

4. The method as defined in claim 1, wherein said method further comprises the step of positioning the road wheel of the vehicle on an alignment rack, wherein said alignment rack provides a measurement of said measured true angular position.

5. The method as defined in claim 1 further comprising the step of connecting a diagnostic tool to a controller in said vehicle for downloading said measured true angular position of said road wheel to said controller.

6. A wheel alignment method for aligning one or more road wheels of a vehicle equipped with a steer-by-wire steering system, said method comprising the steps of:
   measuring a true angular position of a road wheel of a vehicle;
   sensing a wheel angle position of the wheel of the vehicle with an angular position sensor;
   comparing the sensed wheel angle position to the measured true angular position;
   determining an offset alignment value as a function of said comparison; and
   adjusting position of the road wheel as a function of said offset alignment value.

7. The method as defined in claim 6 further comprising the step of positioning the road wheel of the vehicle on an alignment rack, wherein said alignment rack provides a measurement of the measured true angular position of the road wheel.

8. The method as defined in claim 6 further comprising the steps of:
   sensing position of a steering wheel; and
   controlling actuation of the road wheel as a function of said sensed steering wheel position and said offset alignment value.

9. A steer-by-wire steering and alignment system for a vehicle equipped with one or more road wheels, said system comprising:
   an actuator for actuating a road wheel of said vehicle;
   an actuator position sensor for sensing angular position of said road wheel;
   a controller for controlling said actuator;
   a steering wheel for controlling directivity of said road wheel;
   a steering wheel sensor for sensing position of said steering wheel, said steering wheel sensor providing a signal to control actuation of said road wheel;
   an alignment measuring device for measuring true angular position of the wheel; and
   a controller for comparing the sensed angular position and the measured true angular position and determining an offset adjustment value as a function of said comparison, and further adjusting position of the wheel as a function of the offset alignment value.

10. The system as defined in claim 9, wherein said controller comprises a load road wheel controller, and a master controller.

11. The system as defined in claim 9 further comprising an interface device coupled in communication with said controller and said alignment measuring device for downloading said measured true angular position to said controller.

12. The system as defined in claim 11, wherein said interface device comprises a diagnostic tool.

13. The system as defined in claim 12, wherein said diagnostic tool is coupled to a vehicle bus which in turn is in communication with said controller.

* * * * *